Jan. 5, 1965 D. J. PALMER 3,163,871
APPARATUS FOR THE EXTRACTION OF VENOM FROM BEES
Filed May 11, 1962 2 Sheets-Sheet 1

INVENTOR
DERYCK JACK PALMER
BY *A. Yates Dowell III*
ATTORNEYS

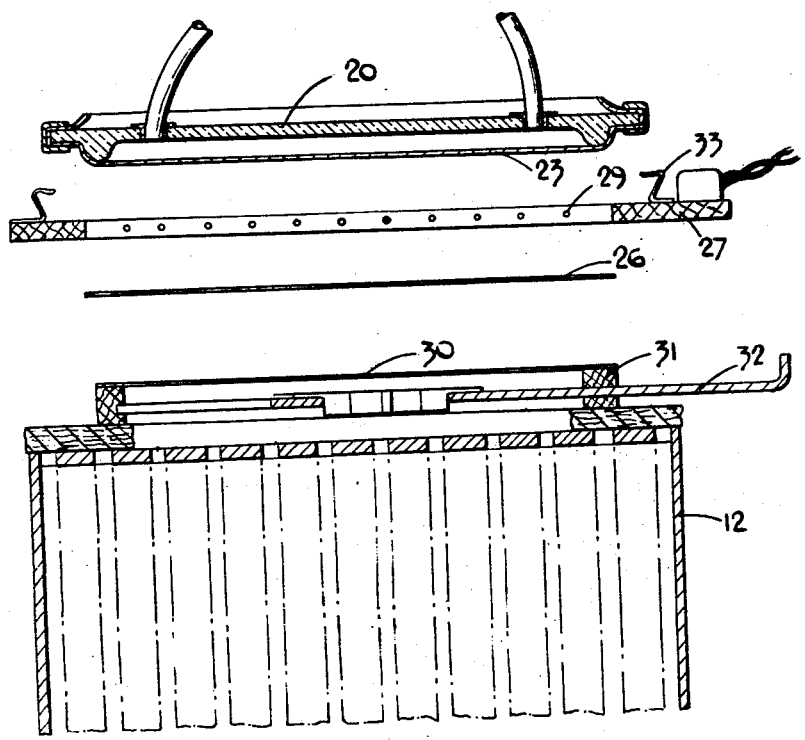

United States Patent Office 3,163,871
Patented Jan. 5, 1965

3,163,871
APPARATUS FOR THE EXTRACTION OF
VENOM FROM BEES
Deryck Jack Palmer, "Birchfield," Wolverhampton Road,
Codsall, England
Filed May 11, 1962, Ser. No. 193,990
1 Claim. (Cl. 6—12)

This invention relates to an apparatus for the extraction of venom from bees.

It has been found that bee venom contains a number of enzymes and it is accordingly an object of the present invention to provide an apparatus whereby bee venom can be collected under conditions such that the properties of the enzymes will not be adversely affected.

Figure 1:
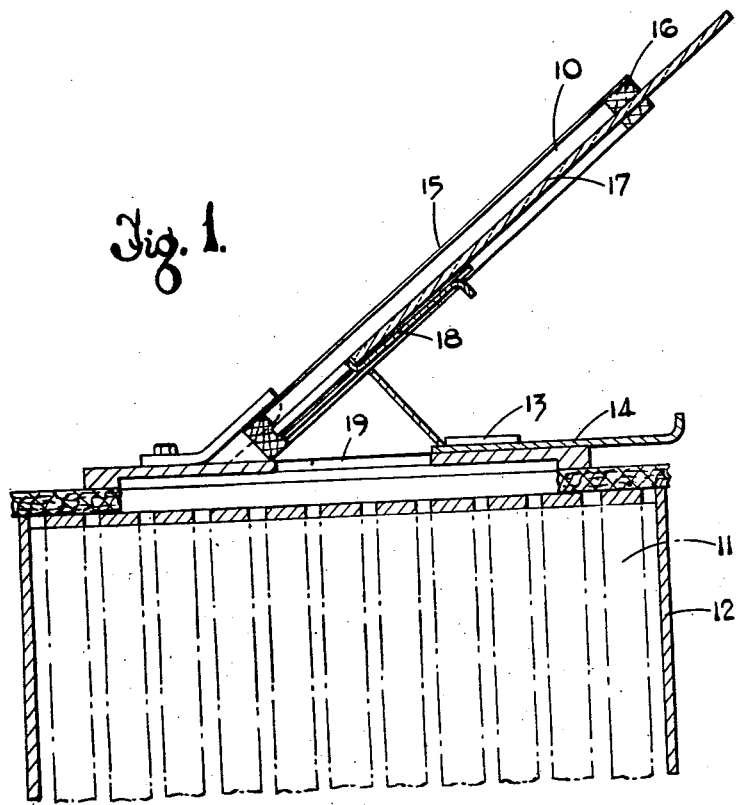
Figure 2:
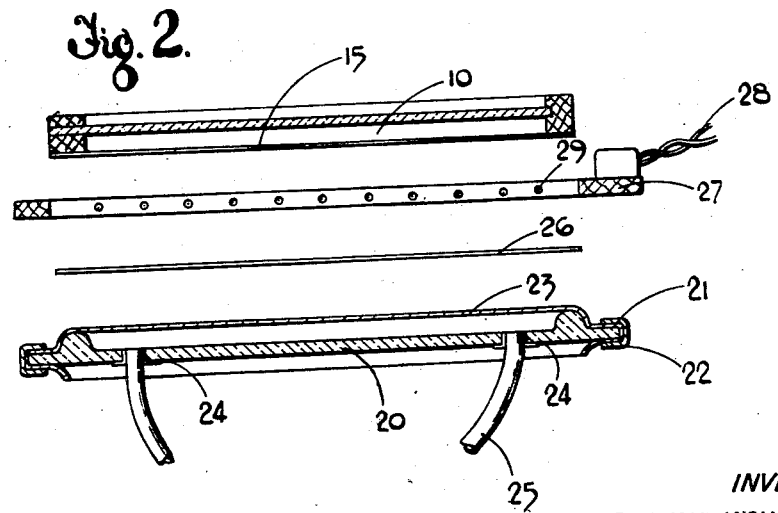

Apparatus for carrying out the invention is illustrated in the accompanying drawings wherein FIGURE 1 shows the mounting of a collecting magazine on top of a hive, FIGURE 2 is an exploded view showing the magazine, supporting member, and ancillary equipment ready for collection of venom and FIGURE 3 is an exploded view showing the supporting member and ancillary equipment ready for direct application to the top of the hive.

In the form of my invention illustrated in FIGURES 1 and 2, the bees are firstly collected in a magazine 10 which is supported above the combs 11 in a hive 12 in association with a "Porter" bee escape 13 with which is associated a shutter 14. The magazine 10 has one face thereof constituted by a fine nylon or Terylene mesh screen 15 carried by a suitable frame 16 and the other face thereof constituted by a slideable glass panel 17 which is slideably mounted in the frame 16.

Associated with the glass panel 17 is a shutter 18 which can be used to control the admission of light to the hive 12 and the collection of bees in the magazine 10 is obtained as follows. The magazine is placed in position over an upper opening 19 in the hive and the shutters 14 and 18 together with the glass panel 17 are moved to open position as shown in FIGURE 1. Light will thus be admitted to the top of the hive and it has been found that older bees will fly upwards in defense of the hive and will therefore enter the space in the magazine between the mesh 15 and glass panel 17 whilst the young bees, which have little venom content will dive downwardly away from the light. When sufficient bees have been collected in the magazine 10 the shutter 18 and the glass panel 17 can be closed and the full magazine removed from the top of the hive. Further magazines can then be filled in a similar manner. Then by closing shutter 14, bees trapped between shutters 18 and 14 will return to combs 11, by way of "one-way" (Porter) escape 13.

The magazine can then be taken to a suitable place for the actual venom collection. The apparatus for the collection of the venom includes a shallow collecting vessel 20 which is preferably made of glass. This vessel is provided with a peripheral flange 21 to which can be attached by clips 22 a thin sheet of silicone rubber 23. This sheet of silicone rubber is preferably between .005" and .008" thick. The base of the collecting vessel 20 is provided with two ports 24 to each of which is secured a tube or pipe 25, the purpose of which will be explained hereafter.

Resting on the silicone rubber sheet 23 is a sheet 26 of thin wet tissue paper and resting on this sheet and supported by a frame 27 is an electric shock producing unit which is connected by wires 28 to a suitable variable transformer which is then connected to a suitable alternating current supply. Stretched across the frame 27 are a number of fine wires 29 which are connected alternately to the positive and negative leads 28. The magazine 10 containing the bees is then laid on top of the wires 29 with the mesh screen 15 adjacent the wires.

Due to the dimensional thinness of the mesh 15 and the wires 29 the bees will in effect be standing on the wet tissue paper 26 which is itself resting directly on the silicone rubber sheet 23. When an electric current is applied to the wires 29 the bees react by driving their stings through the mesh, through the tissue and through the silicone rubber. It has been found that an initial 60 volts will cause the bees to drive their stings in and the voltage is then decreased to, say, 10 volts for a period of some 5 to 10 seconds, such voltage being sufficient to hold the bees in the stinging posture. Upon switching off the current the bees are able to withdraw their stings and leave a globule of pure venom on the underside of the silicone rubber sheet.

The venom which is obtained can be dried by passing air or gasses across the underside of the sheet through the medium of the tubes 25 and can then be removed from the sheet in crystal form. Alternatively the space between the underside of the sheet 23 and the base of the collecting vessel 20 can be filled with a suitable solution, for example, physiological saline, which will dissolve the venom and the solution can then be withdrawn through the tubes 25 for further treatment.

It has been found that the bees exhibit considerable hunger after the venom has been extracted and, with the bees still in the magazine, they can readily be placed over a suitable feed before being released.

Observations made on marked bees have shown that the bees appear to suffer no damage or harm and marked bees have been observed carrying out normal activity several days after the venom has been extracted. An alternative way of using the apparatus is shown in FIGURE 3, where the collecting vessel 20 is used in the inverted position and a fine nylon or Terylene mesh 30 is stretched over a suitable frame 31 with which is associated a slide 32 with a built-in "Porter" bee escape the whole being mounted directly on the top of the hive 12. The thin wet tissue sheet 26 is rested on top of the mesh 30 and the wires 29 and frame 27 are interposed between the silicone rubber sheet 23 and the wet tissue 26. For convenience in handling this form of the apparatus the frame 27 is provided with clips 33 whereby the frame and collecting vessel can be clipped together.

The method of collection is as described above and upon the opening of the slide 32 the older bees will fly upwards towards the light, will settle on the mesh 30 and the collection of venom is then carried out as described above.

What I claim then is:

Apparatus for collecting bee venom which includes a collecting vessel having an opening, a thin sheet of silicone rubber which extends across said opening and a sheet of moist tissue paper mounted on the silicone rubber sheet on the side thereof opposite to said opening, means being provided for applying an electrical shock to bees which have settled on the moist tissue paper so that the bees sting through the sheet of tissue paper and through the thin sheet of silicone rubber so that bee venom is excreted in globules on the underside of the sheet of silicone rubber, which globules crystallise on exposure to the atmosphere so as to enable the bee venom to be collected from the underside of the sheet of silicone rubber.

References Cited by the Examiner
FOREIGN PATENTS
507,269    6/39    Great Britain.

OTHER REFERENCES
Weide: XVII International Beekeeping Congress, pub. in Atti ufficiali 2:384–386 (1960).

RICHARD A. GAUDET, *Primary Examiner.*